(12) United States Patent
Ducey

(10) Patent No.: US 6,237,860 B1
(45) Date of Patent: *May 29, 2001

(54) METHOD AND APPARATUS FOR SPRAYING PRESSURIZED WATER

(75) Inventor: Lawrence E Ducey, Laurel, MD (US)

(73) Assignee: Potomac Rain Room, Laurel, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/472,007

(22) Filed: Dec. 27, 1999

Related U.S. Application Data

(60) Division of application No. 08/673,502, filed on Jul. 1, 1996, now Pat. No. 6,015,099, which is a continuation-in-part of application No. 08/238,539, filed on May 4, 1994, now Pat. No. 5,540,383, which is a continuation-in-part of application No. 08/236,000, filed on Dec. 10, 1993, now abandoned.

(51) Int. Cl.⁷ .............................. B05G 1/20; A01G 25/02
(52) U.S. Cl. .......................... 239/266; 239/267; 239/268; 239/273; 239/282; 239/289; 239/211
(58) Field of Search .................................... 239/266, 267, 239/268, 273, 280, 289, 209, 550, 211

(56) References Cited

U.S. PATENT DOCUMENTS

| | | | |
|---|---|---|---|
| 910,400 | * | 1/1909 | Lischer .................................. 239/208 |
| 1,824,563 | * | 9/1931 | O'Connor ........................ 239/209 X |
| 2,625,434 | | 1/1953 | Freestone . |
| 2,665,171 | | 1/1954 | Stievater . |
| 2,986,842 | | 6/1961 | Toulmin, Jr. . |
| 3,752,472 | | 8/1973 | Snead . |
| 3,837,405 | * | 9/1974 | Huddle .............................. 239/209 X |
| 3,889,881 | * | 6/1975 | Cunningham et al. .......... 239/208 X |
| 3,983,192 | | 9/1976 | Stoker . |
| 3,992,813 | | 11/1976 | Freshel . |
| 4,079,786 | * | 3/1978 | Moling .............................. 239/209 X |
| 4,330,040 | * | 5/1982 | Ence et al. ....................... 239/209 X |
| 5,330,104 | | 7/1994 | Marcus . |
| 5,441,202 | | 8/1995 | Wintering et al. . |
| 5,480,336 | | 1/1996 | Blanchard . |
| 5,865,143 | * | 2/1999 | Moore, Jr. ........................ 239/209 X |

OTHER PUBLICATIONS

Spraying Systems Co., *Spray Nozzles and Accessories*, Industrial Catalog No. 27, Wheaton, Illinois.

\* cited by examiner

*Primary Examiner*—Patrick Brinson
*Assistant Examiner*—Robin O. Evans
(74) *Attorney, Agent, or Firm*—Snider & Associates; Ronald R. Snider

(57) ABSTRACT

A spray apparatus includes a pump for pressurizing water, a drive unit for driving the pump, a flow regulator for regulating the flow of water pressurized by the pump, and a modular spray assembly. The modular spray assembly includes piping connected to the pump, a plurality of quick coupler units connected to the piping, and water outlets connected to the quick coupler units through which the pressurized water is sprayed, wherein the pressurized sprayed water creates a mist and a wind. The spray apparatus can be assembled in a tent-like structure to provide a rain room, wherein a mist and a wind are generated by the apparatus.

30 Claims, 11 Drawing Sheets

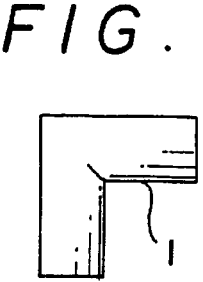
FIG. 1
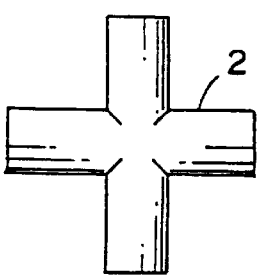
FIG. 2
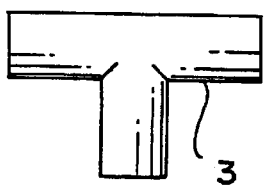
FIG. 3
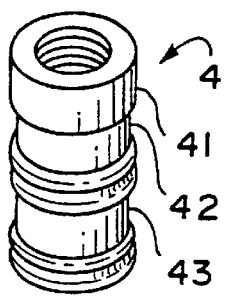
FIG. 4A
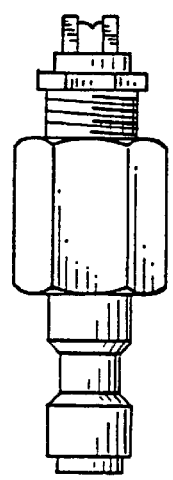
FIG. 5
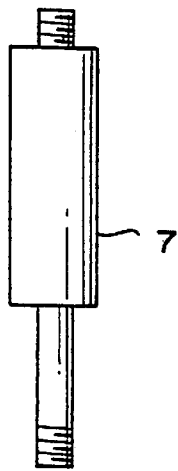
FIG. 6A
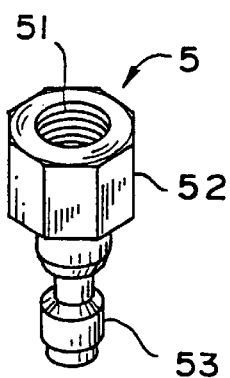
FIG. 4B
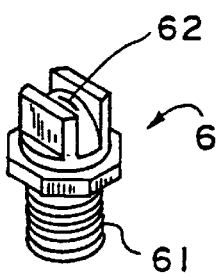
FIG. 4C
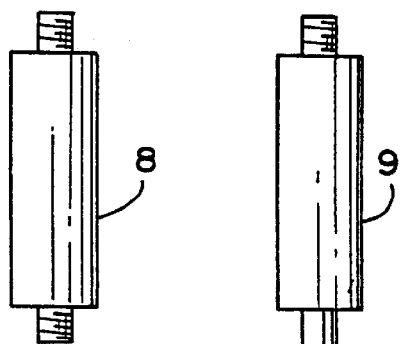
FIG. 6B
FIG. 6C

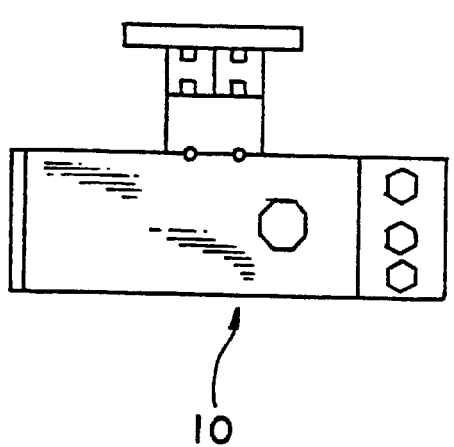
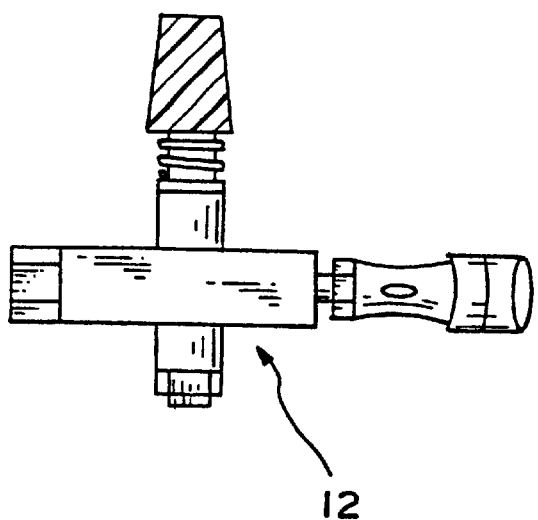
FIG. 7  FIG. 9
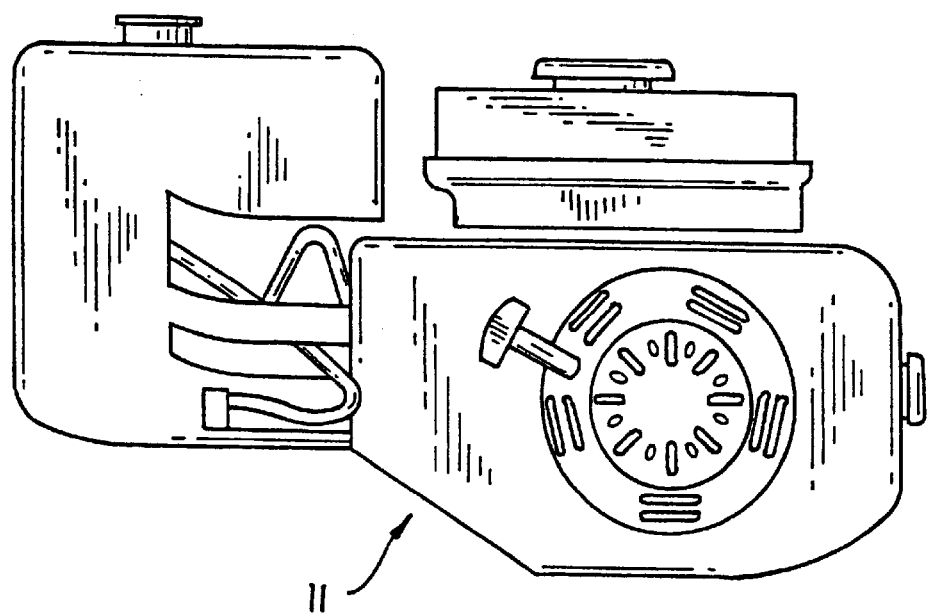
FIG. 8

| NOZZLE SIZE | ORIFICE DIAM. (INCHES) | 40 PSI | 100 PSI | 250 PSI | 500 PSI | 600 PSI | 700 PSI | 800 PSI | 1000 PSI | 1200 PSI | 1500 PSI | 2000 PSI | 2500 PSI | 3000 PSI | 3500 PSI | 4000 PSI |
|---|---|---|---|---|---|---|---|---|---|---|---|---|---|---|---|---|
| 2 | .034 | .20 | .32 | .50 | .71 | .77 | .80 | .89 | 1.0 | 1.1 | 1.2 | 1.4 | 1.6 | 1.7 | 1.9 | 2.0 |
| 4 | .052 | .40 | .63 | 1.00 | 1.40 | 1.60 | 1.70 | 1.80 | 2.0 | 2.2 | 2.5 | 2.8 | 3.1 | 3.5 | 3.8 | 4.0 |
| 4.5 | .055 | .45 | .71 | 1.10 | 1.50 | 1.70 | 1.90 | 2.00 | 2.2 | 2.4 | 2.8 | 3.0 | 3.6 | 3.9 | 4.3 | 4.5 |
| 5 | .057 | .50 | .79 | 1.30 | 1.80 | 1.90 | 2.10 | 2.20 | 2.5 | 2.8 | 3.1 | 3.6 | 4.0 | 4.4 | 4.7 | 5.0 |
| 5.5 | .060 | .55 | .87 | 1.40 | 1.90 | 2.10 | 2.30 | 2.50 | 2.8 | 3.0 | 3.4 | 3.8 | 4.4 | 4.8 | 5.2 | 5.5 |
| 6 | .062 | .60 | .95 | 1.50 | 2.10 | 2.30 | 2.50 | 2.70 | 3.0 | 3.2 | 3.7 | 4.2 | 4.8 | 5.2 | 5.6 | 6.0 |
| 6.5 | .064 | .65 | 1.00 | 1.70 | 2.30 | 2.50 | 2.70 | 2.90 | 3.3 | 3.6 | 4.0 | 4.6 | 5.2 | 5.7 | 6.0 | 6.5 |
| 7 | .067 | .70 | 1.10 | 1.80 | 2.50 | 2.70 | 2.90 | 3.10 | 3.5 | 3.8 | 4.3 | 5.0 | 5.6 | 6.1 | 6.6 | 7.0 |
| 7.5 | .070 | .75 | 1.20 | 1.90 | 2.70 | 2.90 | 3.20 | 3.40 | 3.8 | 4.1 | 4.6 | 5.3 | 6.0 | 6.5 | 7.0 | 7.5 |
| 8 | .072 | .80 | 1.30 | 2.00 | 2.80 | 3.10 | 3.40 | 3.60 | 4.0 | 4.4 | 5.0 | 5.6 | 6.2 | 7.0 | 7.5 | 8.0 |
| 8.5 | .074 | .85 | 1.30 | 2.20 | 3.00 | 3.30 | 3.60 | 3.80 | 4.3 | 4.6 | 5.3 | 6.0 | 6.7 | 7.4 | 8.0 | 8.5 |
| 9 | .076 | .90 | 1.40 | 2.30 | 3.20 | 3.50 | 3.80 | 4.00 | 4.5 | 5.0 | 5.5 | 6.4 | 7.1 | 7.8 | 8.5 | 9.0 |
| 9.5 | .078 | .95 | 1.50 | 2.40 | 3.40 | 3.70 | 4.00 | 4.30 | 4.8 | 5.2 | 5.8 | 6.8 | 7.6 | 8.3 | 9.0 | 9.5 |
| 10 | .080 | 1.00 | 1.60 | 2.50 | 3.50 | 3.90 | 4.20 | 4.50 | 5.0 | 5.4 | 6.1 | 7.0 | 8.0 | 8.7 | 9.4 | 10.0 |
| 12 | .087 | 1.20 | 1.90 | 3.00 | 4.20 | 4.60 | 5.00 | 5.40 | 6.0 | 6.4 | 7.3 | 8.4 | 9.5 | 10.4 | 11.2 | 12.0 |
| 15 | .094 | 1.50 | 2.40 | 3.80 | 5.30 | 5.80 | 6.40 | 6.80 | 7.5 | 8.2 | 9.2 | 10.6 | 12.0 | 12.9 | 14.0 | 15.0 |
| 20 | .109 | 2.00 | 3.20 | 5.00 | 7.10 | 7.80 | 8.40 | 9.00 | 10.00 | 10.8 | 12.2 | 14.2 | 16.0 | 17.4 | 18.8 | 20.0 |
| 30 | .141 | 3.00 | 4.70 | 7.50 | 10.60 | 11.60 | 12.80 | 13.60 | 15.00 | 16.40 | 18.40 | 21.2 | 24.0 | 26.0 | 28.0 | 30.0 |
| 40 | .156 | 4.00 | 6.30 | 10.00 | 14.20 | 15.60 | 16.80 | 18.00 | 20.00 | 21.60 | 24.40 | 28.4 | 32.0 | 34.8 | 37.6 | 40.0 |

METHOD AND APPARATUS FOR SPRAYING PRESSURIZED WATER

CROSS-REFERENCE TO RELATED APPLICATIONS

The present application is a division of U.S. Ser. No. 08/673,502, filed on Jul. 1, 1996, now U.S. Pat. No. 6,015,099 which was a continuation-in-part of U.S. Ser. No. 08/238,539, filed on May 4, 1994, now U.S. Pat. No. 5,540,383 which is a continuation-in-part of U.S. Ser. No. 08/236,000, filed on Dec. 10, 1993, now abandoned.

BACKGROUND OF THE INVENTION

1. Field of the Invention.

The present invention relates to a method and apparatus for spraying water, and more particularly to a method and apparatus for spraying a fine mist of water in order to cool off and/or entertain people.

2. Description of Related Art.

For generations, children, and even an occasional adult, have fought summer heat by running through lawn sprinklers. Although that activity is enjoyable, the spray from the lawn sprinkler tends to be rather coarse. Accordingly, the participants usually get very wet, very quickly.

In another attempt to cool people, some hotels in warmer clients have installed nozzles in sunbathing areas so that sunbathers may be misted with a very fine, gentle spraying of mist as they sit in the sun. These systems are permanently plumbed to an exterior wall or other structure of the hotel, and are not intended to be portable or otherwise dismantled. In addition, the mist admitted from such nozzles is intended to be barely noticeable by the sunbathers. Specifically, the spray is very subtle. See pages 40–41 of Water The Power, Promise, and Turmoil of North America's Fresh Water, National Geographic Special Edition, © 1993.

Another device of interest is fog making equipment that has been developed and used in the movie industry. This equipment is intended to be laid on the ground to emit a mist in such a manner so as to create fog along the ground. See U.S. Pat. Nos. 3,788,542; 3,894,691; and 4,039,144.

OBJECTS AND SUMMARY

It is an object of the present invention to provide heat relief to large crowds of people for safety and entertainment using environmentally friendly equipment and methods.

It is another object of the present invention to allow for varying degrees of mist to meet different crowd preferences, so that it is not necessary to get soaked to bring the body temperature down.

It is yet another object of the present invention to provide a modular spray assembly for spraying pressurized water.

It is still another object of the present invention to provide a temporary structure and spray assembly for spraying pressurized water which has a variable size depending on the crowd requirements.

It is another object of the present invention to provide a spray assembly for spraying pressurized water which creates a windy environment which is entertaining for all ages.

It is another object of the present invention to provide a modular spray assembly which is easy to put together and install.

A spray apparatus comprises a vertical tube having an inlet at one end thereof for receiving pressurized water, and a plurality of nozzles attached thereto; and means for supporting said vertical tube; each of said nozzles having an equivalent orifice diameter in the range of 0.026 to 0.076 inches.

A misting apparatus comprises a structure having a roof; a distributor mounted within said structure to the roof of the structure, the distributor including an elongate body having an inlet at one end thereof, an internal passage connected to said inlet and extending through the elongate body, and a plurality of openings spaced along said body, wherein each of said openings are connected to said internal passage; a plurality of nozzles for spraying a high pressure mist, each of said nozzles having an equivalent orifice diameter in the range of 0.026 to 0.076 inches; each of said nozzles connected to a respective one of said plurality of openings tubing interconnecting said distributor to a source of pressurized water.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention of the present application will now be described in more detail with reference to the preferred embodiments of the device, given only by way of example, and with reference to the accompanying drawings, in which:

FIG. 1 is an example of a fitting used according to an embodiment of the present invention;

FIG. 2 is an example of another fitting used according to an embodiment of the present invention;

FIG. 3 is an example of another fitting used according to an embodiment of the present invention;

FIG. 4A is an example of a quick coupler fitting used according to an embodiment of the present invention;

FIG. 4B is an example of a plug for use with the quick coupler fitting of FIG. 4A according to an embodiment of the present invention;

FIG. 4C is an example of a nozzle for use with the plug of FIG. 4B and according to an embodiment of the present invention;

FIG. 5 illustrates the coupling of the plug of FIG. 4B with the nozzle of FIG. 4C according to an embodiment of the present invention;

FIGS. 6A through 6C are examples of piping used in an embodiment of the present invention;

FIG. 7 is a top view illustration of a pump used in an embodiment of the present invention;

FIG. 8 is a side view of a drive unit used in an embodiment of the present invention;

FIG. 9 is a top view of a flow and pressure regulator used in an embodiment of the present invention;

DETAILED DESCRIPTION OF THE PREFERRED EMBODIMENTS

Figure 10:
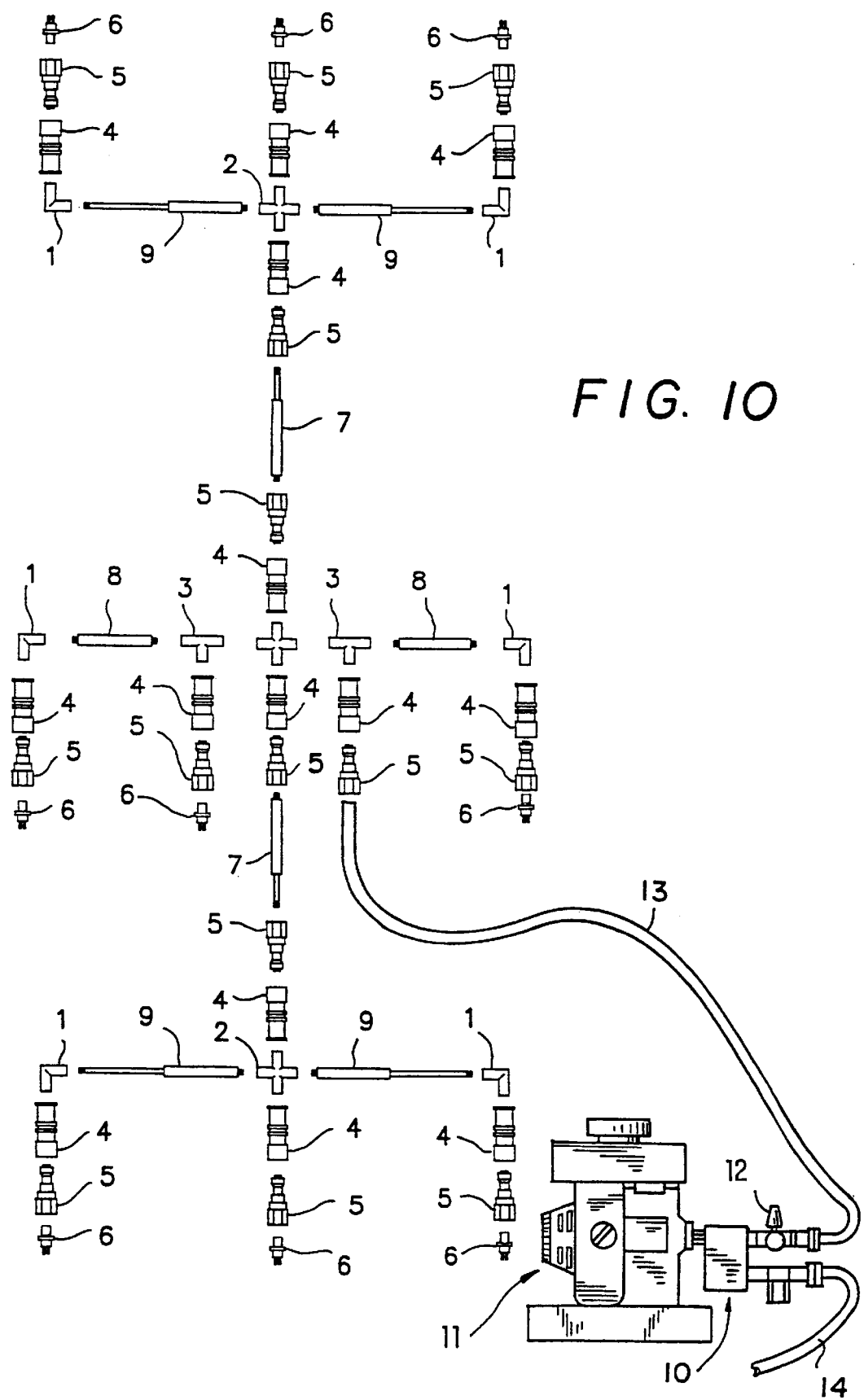
FIG. 10 illustrates a partially exploded view of an exemplary embodiment of a modular spray assembly according to an embodiment of the present invention.
Figure 11:
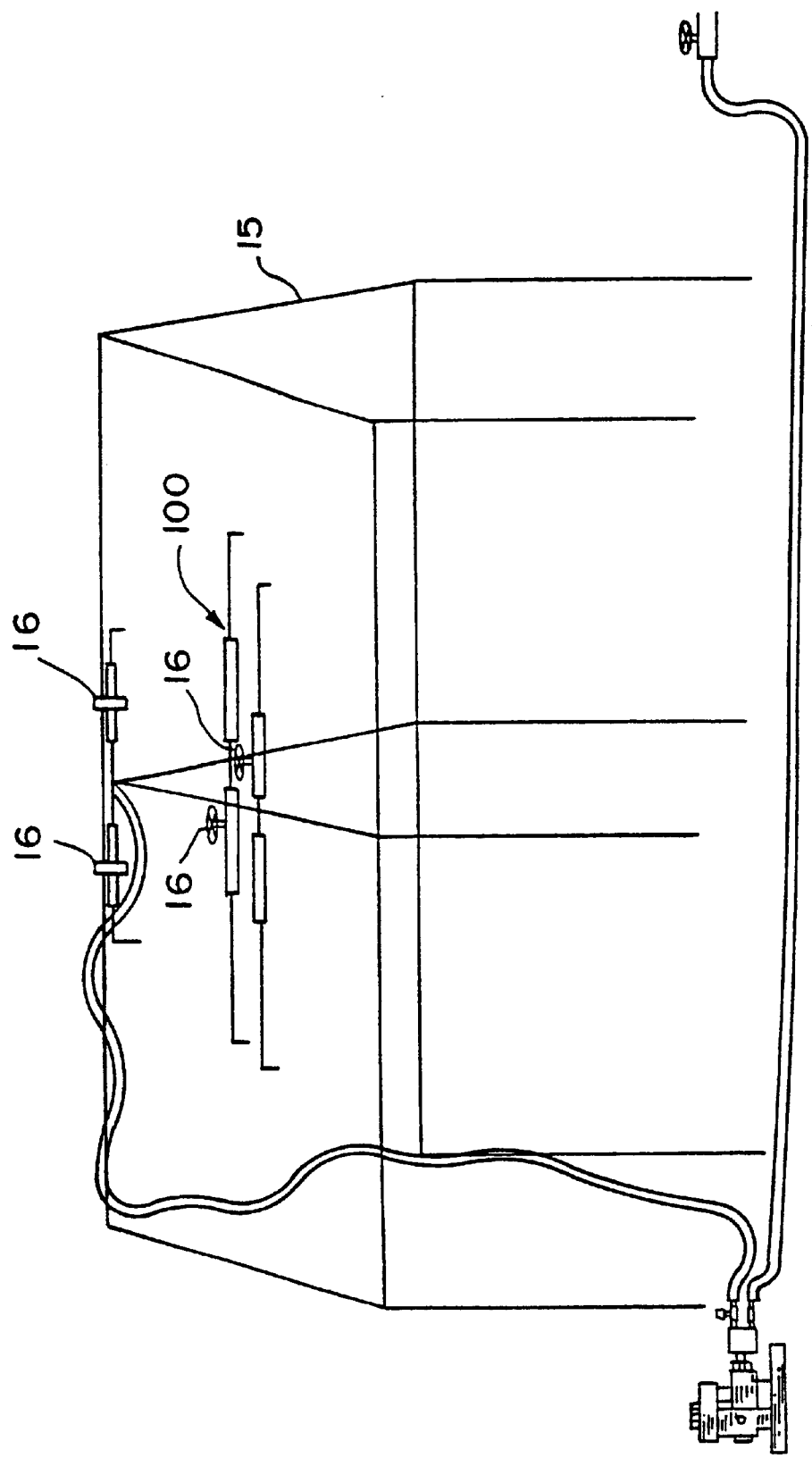
FIG. 11 is an illustration of a spray assembly within a structure according to an embodiment of the present invention.

According to the present invention, an apparatus is provided for relief from hot weather for safety and entertainment using environmentally friendly methods.

A preferred embodiment of the present invention includes an apparatus for spraying pressurized water having a pump, a drive unit, an adjustable flow and pressure regulator which provides for spray control, and a spray assembly for spraying the pressurized water. The spray assembly includes piping, fittings and nozzles or water outlets. The nozzles are selected to provide an outlet for the pressurized water, and are placed in a configuration such that when pressurized water is sprayed through them, mist is created and wind is generated.

According to one embodiment of the present invention, people enter a structure, such as a tent, having attached therein a modular spray assembly that emits a fine mist and wind. The tent may be either a fabric material over a frame or a structure having inflatable walls and roof. The structure may be temporarily or permanently located. The water is output through the spray assembly at a selected pressure and in a configuration so as to create mist and wind in the structure.

The pressure of the water used in all of the preferred embodiments may range from about 40 psi to about 1500 psi, or more preferably between 100 psi to 1000 psi, with a preferred pressure of about 500 or 600 psi. The volume of water delivered to the nozzles can be adjusted by changing the flow rate and/or the pressure of the water. These adjustments can be made by a pump, a flow regulator, and a drive unit. The mist configuration can be changed by using nozzles of different sizes and shapes, and by adjusting the angular orientation of the nozzles. The apparatus may fill the area inside the structure with mist and wind in which people can obtain relief from the heat.

The size of the water droplets emitted from the nozzles depends on at least three factors: the size of the nozzle opening, the pressure at which the water is delivered to the nozzles, and the angle of the nozzle. The following table sets forth the approximate size of water droplets emitted from a size 1 nozzle, which has a opening diameter of about 0.026 inches, under 500 psi and 1000 psi:

|  | 110 degrees | 80 degrees | 40 degrees |
| --- | --- | --- | --- |
| 500 psi | 150 microns | 175 microns | 200 microns |
| 1000 psi | 85 microns | 120 microns | 170 microns |

Water droplets in the range set forth in the foregoing table (85 to 200 microns) are so small and light that they tend to be blown around quite easily as they fall to the ground. Furthermore, in view of their small size, the water droplets tend to evaporate prior to reaching the ground. As explained in more detail below, such evaporation has a chilling effect.

FIG. 1 illustrates a substantially elbow shaped fitting 1 for use in constructing the spray assembly according to the present invention. FIG. 2 illustrates a four-way fitting 2, and FIG. 3 illustrates a three-way T-shaped fitting 3 for use in the spray assembly according to the present invention.

According to a preferred embodiment, the fittings and piping described herein can be made of copper or brass. Other suitable materials may be used, such as other metals or plastics within the skill of the ordinary artisan once in possession of the instant disclosure.

FIG. 4A illustrates a quick coupler fitting 4 for use in the spray assembly according to the present invention. One such quick coupler 4 is the model no. BST-2 or BST-3, sold by Parker Fluid Connectors of Minneapolis, Minn. The quick coupler fitting 4 includes an upper portion 41 into which a threaded connector is inserted. The connector may be a simple threaded piece of pipe that is used to connect the quick coupler fittings to pipe fittings, as is known in the art.

Figures 12, 13:
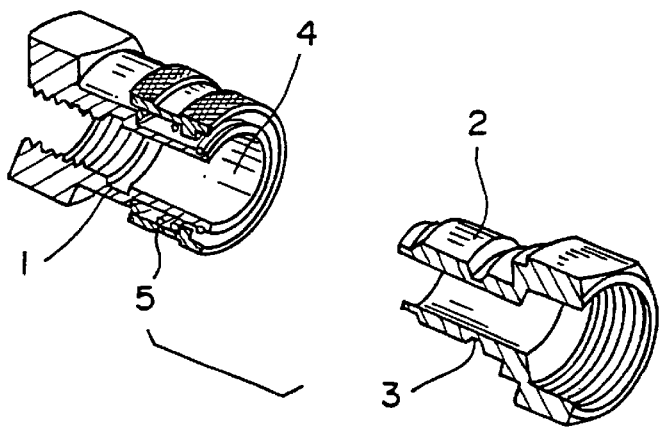
FIG. 12 is a cross-sectional view of a quick coupler connector.
FIG. 13 is a table of nozzle statistics.

The quick coupler fitting 4 of FIG. 4A also includes a lower portion 42 and a movable portion 43. The lower portion 42 is smaller in diameter than the upper portion 41 and the movable portion 43 such that the movable portion 43 can slide over the lower portion 42 until it is stopped by the upper portion 41 to provide the quick coupling effect. Sliding the movable portion 43 enables ball bearings to be retracted so that a connector may be released. See FIG. 12 for a cross-sectional view of a quick coupler connector.

FIG. 4B illustrates a quick coupling plug 5 for insertion into the quick coupler fitting 4. Quick coupling plug 5 includes a lower portion 53 which can be inserted into the quick coupler fitting 4 when the movable portion 43 is slid towards the upper portion 41. Releasing the movable portion 43 then provides the coupling effect by locking the lower portion 53 into the quick coupler fitting 4. Quick coupling plug 5 also includes an upper portion 52 which has a threaded hole 51, the use of which will be described below. An exemplary quick coupling plug 5 is model no. SST-N2 or SST-N3, available from Parker Fluid Connectors of Minneapolis, Minn.

FIG. 4C illustrates a nozzle 6 which includes a threaded portion 61 to be threaded in the hole 51 of the quick coupling plug 5. The nozzle 6 includes an opening 62 through which water is emitted. An exemplary water outlet or nozzle can be obtained from Spraying Systems Co., part no. H1/4VV 8001. The present invention can be implemented using a number of different nozzles having different angles and nozzle sizes. According to one embodiment, a one-quarter inch VeeJet nozzle can be used. Preferable angles include 110°, 95°, 80°, 40°, 25°, or 15° although other nozzle angles can be used. The smaller the nozzle angle, the straighter the nozzle output is sprayed. Therefore, larger angles achieve coverage of a larger area with a softer spray than is achieved using smaller angles. The nozzle equivalent orifice diameter is preferably within the range of 0.026 to 0.076 inches, or more preferably, within the range of 0.026 to 0.070 inches.

FIGS. 6A through 6C illustrate pipings 7, 8 and 9 of varying sizes and shapes which can be used to construct the spray assembly according to the present invention. These pipings may be flexible or rigid. Each of the pipings includes a male threaded portion on the ends so that they may be attached to the fittings of FIGS. 1–3. When the spray assembly is assembled, the elbow shaped fittings 1 are connected to the nozzles 6 by the quick coupler fittings 4 and quick coupling plug 5. One such arrangement is shown in FIG. 10.

FIG. 7 illustrates a top view of a pump 10 which is used in an embodiment of the present invention. An exemplary pump that may be used is the WG-1932 model that is available from Admiral Pump of Springdale, Ark.

FIG. 8 illustrates a drive unit 11 which can be used to drive the pump according to an embodiment of the present invention. An exemplary drive unit, or engine, is the model GX160, type K1, variation QX, 5.5 horsepower OHV horizontal shaft engine, available from American Honda Motor Co., Inc. Alternatively, an electric motor could be used.

FIG. 9 illustrates a flow and pressure regulator 12 which can be used in the spray assembly apparatus according to an embodiment of the present invention. The flow and pressure regulator 12 includes a regulator unloader which controls the amount of water which bypasses the pump 10. By reducing the amount of water delivered to the nozzles, the wind effect is reduced. Conversely, as the amount of water through the nozzles is increased, the pressure increases, thus increasing the wind effect and reducing the temperature. The flow regulator may be an AP-550 Regulator/Unloader that is distributed by Admiral Pump in Springdale, Ark.

FIG. 10 illustrates a partially exploded view of an exemplary embodiment of a spray assembly according to the present invention. The spray assembly includes pipings 7, 8 and 9 with male pipe threading on the end to attach to the fittings 1, 2, 3.

The elbow shaped fittings 1 can be arranged to point downward in varying degrees. The fittings 1 are preferably connected to the nozzles 6 through quick coupler fittings 4 and quick coupler plugs 5. The quick coupler fittings and plugs are modular elements, the use of which allows for easy assembly and repair. Where the piping elements join, four-way fittings 2 and three-way T-shaped fittings 3 are used. The quick coupler connections can be used throughout the assembly between the piping elements 7, 8, 9 so that the entire assembly can be quickly and easily assembled and disassembled.

One end of a hose 13 is connected to a center portion of the spray assembly and the other hose end is connected to the pump 10 through the flow and pressure regulator 12. The drive unit 1 is also connected to the pump 10. Another hose 14 is used to connect the pump 10 to a water supply.

FIG. 11 illustrates an embodiment of the spraying assembly according to the present invention which has been installed within a structure 15, such as a tent. The tent may include only a roof and a supporting frame, i.e., without walls. Alternatively, the tent may include one or more walls. In another embodiment, the structure 15 may include an inflatable structure having an inflatable floor and walls. In other embodiments of the present invention, the tubing and nozzles may be configured in the open or against a wall, i.e., without a tent or enclosure.

Straps 16 may be used to attach the spray assembly apparatus to the roof or walls of the structure. According to one embodiment, the straps 16 are made of a material flexible, such as nylon, which can be wrapped around the supports for the structure and the piping of the spray assembly.

One embodiment of the present invention involves a temporary structure with a modular spray assembly attached therein. The size and shape of the spray assembly when it is assembled may vary dependent on the dimensions of the structure. For example, an 18'×20' structure may use eight, nine, or ten nozzles to achieve the desired mist and wind effect. Other configurations area also possible within the scope of the invention. Additionally, the nozzles are preferably placed at about ten feet from the floor or ground.

With an apparatus according to the present invention, a mist of water may be sprayed from the nozzles of the spraying assembly. The water is delivered using the pump, drive unit, and flow and pressure regulator so that the water is pressurized. When the spray assembly is operated a mist and wind is created due at least in part to the pressurization of the water and the configuration of the assembly. The velocity of the wind depends on several factors. However, the wind could be moving at twenty to thirty miles per hour. The system may also be adjusted so that the wind is moving at five to ten miles per hour.

A cooling effect can be created in at least three different ways by using the present invention. First, as the mist is emitted from the nozzles, sufficient pressure is used so as to create a combination of wind and mist. Accordingly, the wind created by the spray, has a mild wind chill effect on participants. In other words, the mere fact that wind is created in the structure helps to cool people in the structure.

A second way in which a cooling affect is created is through evaporation. As water evaporates, it absorbs heat from the surroundings. In fact, vaporization of water requires more than 500 calories per gram of water. Accordingly, as the fine mist evaporates from liquid droplets into gaseous water, it absorbs heat in the structure, thus cooling the structure.

A third cooling affect is created by the pressure drop that the water experiences as it passes through the nozzle. Specifically, the water inside the tubing prior to emission from the nozzle is under high pressure. As set forth earlier, the water pressure may be as high as 1500 pounds per square inch (psi). As that water passes from the high pressure zone within the nozzle to the atmospheric pressure in the structure, a cooling effect is created.

Considering the three aforedescribed cooling reactions, it should be clear that the amount of cooling in the structure is proportional to the pressure under which the system is operating. In other words, by increasing the pressure at the pressure regulator, an increase in the cooling affect will be experienced by people in the structure thus, the "temperature", or effective temperature within the structure can be easily controlled by controlling the pressure regulator.

According to one embodiment of the present invention, a size 9 nozzle, which emits about 3.5 gallons per minute (G.P.M.) at 600 psi, may be used. A size 9 nozzle has an equivalent orifice diameter of about 0.076 inches. FIG. 13 is a chart illustrating the nozzle volume or flow rate in gallons per minute for various nozzles at different water pressure. Although any of the nozzles in FIG. 13 could be used, the smaller nozzles in the table work better than the larger nozzles. For example, nine size 1 nozzles could be used, and would collectively emit about 3.5 gallons per minute.

Preferably, the nozzles are not atomizing nozzles. The nozzles used are preferably nozzles designed to emit a flat spray. However, other types of nozzles may also be used.

Figure 15:
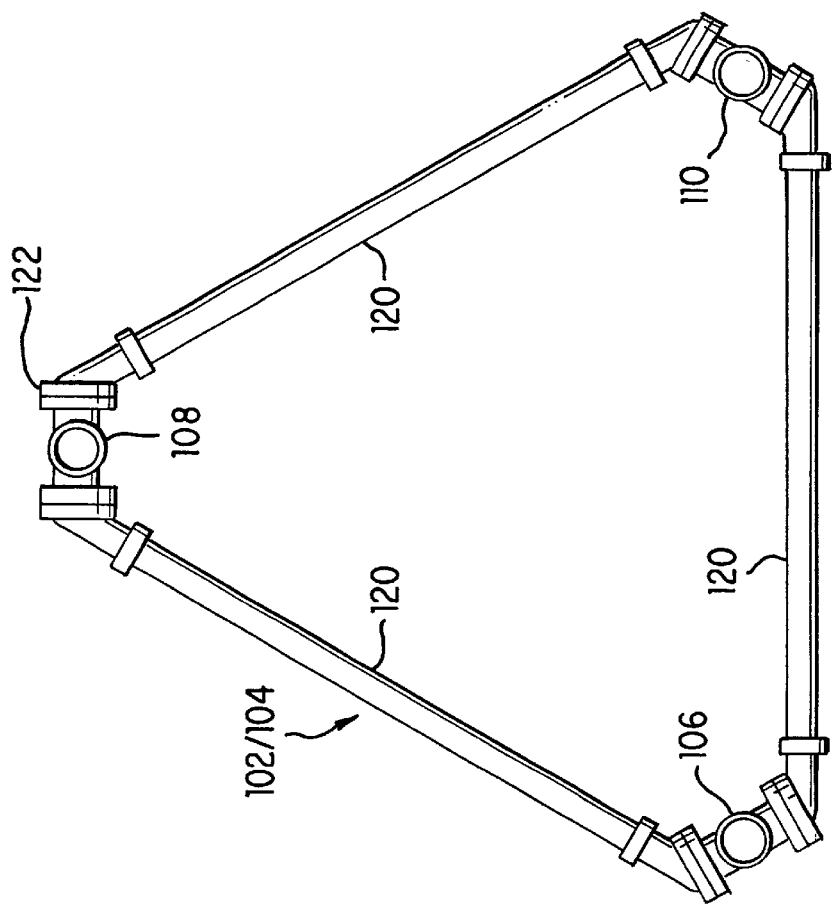
FIG. 15 is a view of the base of the embodiment of FIG. 14.
Figure 14:
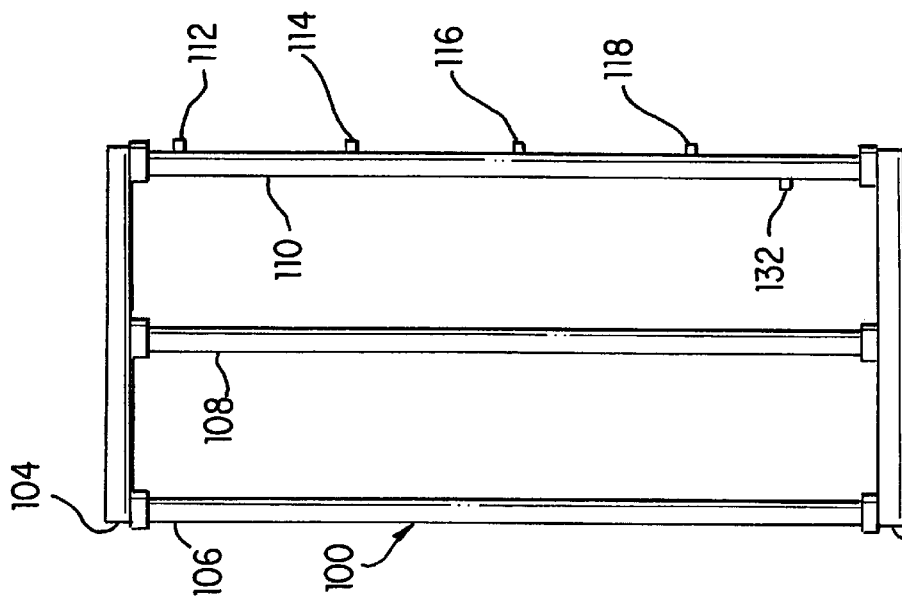
FIG. 14 is a side view of an alternative embodiment of the present invention.

FIGS. 14–19 illustrate two additional preferred embodiments of the present invention, which are frequently referred to as the MISTERY™ embodiments. FIG. 14 is a side elevational view of the MISTERY™ assembly 100. The MISTERY™ 100 includes a base 102 and a top 104. FIG. 15 illustrates a structure that may be used as either the base 102 or the top 104.

Figure 18:
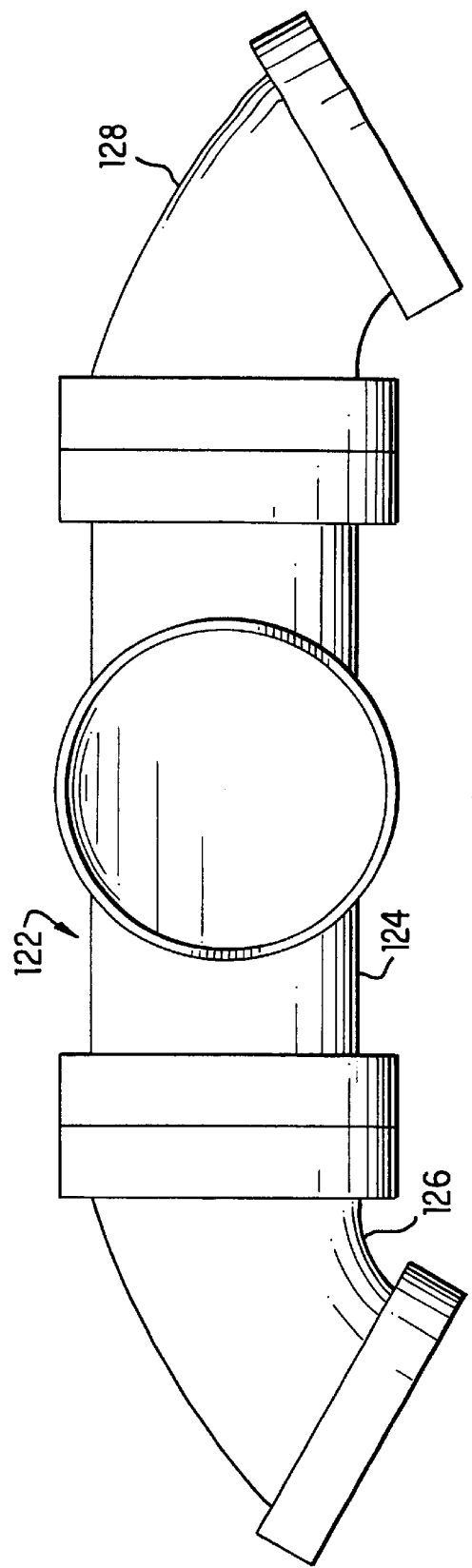
FIG. 18 is a view of a component of FIG. 14.

The main MISTERY™ assembly 100 includes three parallel support tubes 106, 108, 110 interconnecting the base 102 and the top 104. As can be seen in FIG. 15, the base and top assemblies 102, 104 are triangular in shape and the support tubes 106, 108, 110 are equally spaced. FIG. 18 illustrates a corner assembly 122 that is used to interconnect the supports 120 that form the base 102 and the top 104. The corner assemblies 122 include a straight T 124 and two 60° elbows 126, 128. The elements of the MISTERY™ assembly 106, 108, 110, 120, 124, 126, and 128 are all preferably made out of ABS plastic and are preferably 1 ½ inches in diameter. However, any suitable material may be substituted therefore, including, but not limited to, PVC, steel, aluminum, brass, and delrin. In addition, any other diameter that one of skill in the art would realize is a suitable size may be used instead of the 1 ½ inch diameter material.

Figure 17:
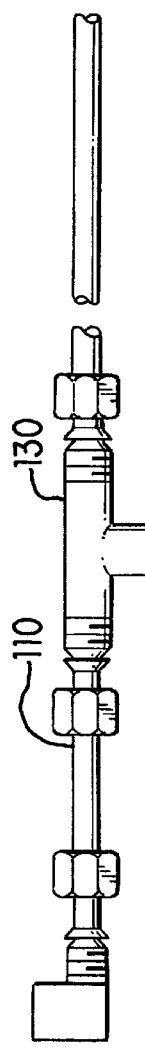
FIG. 17 is a view of a portion of the embodiment of FIG. 14.
Figure 16:
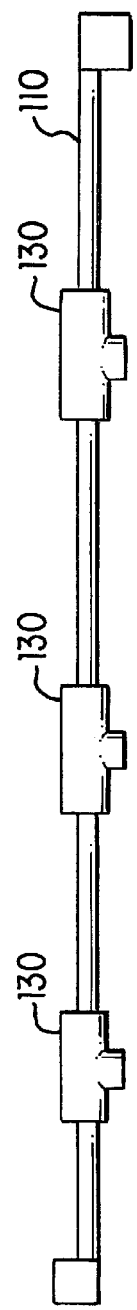
FIG. 16 is a view of a portion of the embodiment of FIG. 14.

As can be seen in FIG. 16, one of the support tubes 110 includes a plurality of T sections 130 that are used to connect nozzles 112, 114, 116, 118 to the support tube 110. FIG. 17 illustrates a portion of support tube 110 and an enlarged view of the T section 130.

Any number of nozzles may be placed along the support tube 110. In a preferred embodiment three nozzles are equally spaced along the support tube 110. In another preferred embodiment, four nozzles are equally spaced along the support tube 110. The nozzles 112, 114, 116, 118 may be of the types described earlier in this document.

For purposes of decoration, elongated banners 134 may be suspended between the base 102/102' and the top assembly 104/104'. An inlet 132 is provided to the support tube 110 for receiving pressurized water that is directed through the support tube 110 to the nozzles 112, 114, 116, 118. The inlet 132 is preferably located near the base 102. However, the inlet 132 may be placed in any convenient location along the support tube 110.

Figure 19:
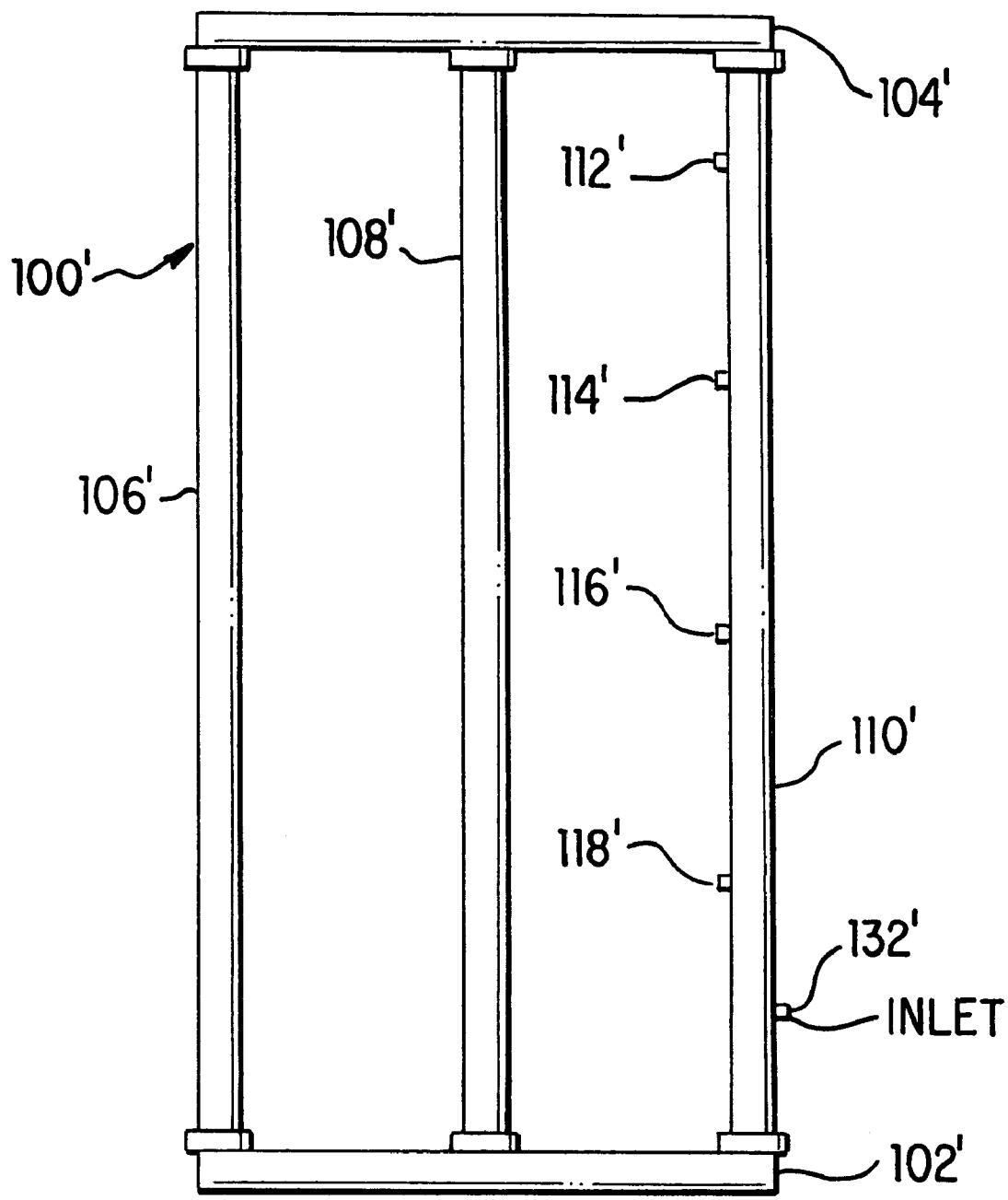
FIG. 19 is a view of an embodiment that is similar to the embodiment of FIG. 14.

FIG. 19 illustrates an alternative embodiment that is similar to the embodiment of FIG. 14 except that the support tube 110 is rotated 180° so that the inlet 132' is facing the outside of the structure and the four nozzles 112', 114', 116', 118' are directed inwardly toward the center of the structure. In all other respects, the MISTERY™ 100' is otherwise the same as the embodiment shown in FIGS. 14–18. In the FIG. 19 embodiment, one of the elongated banners may consist of a plurality of narrow strips so as to create a doorway for a person to enter the structure. In addition, a coin operated timer may be installed so that the spray may be initiated for a fixed period of time by inserting money or tokens into the timer.

Preferably, the MISTERY™ structure 100, 100' is 72 inches in height. The support tubes 120 of the base and top assemblies are preferably 24 inches in length. However, any suitable dimensions may be substituted.

Figure 20:
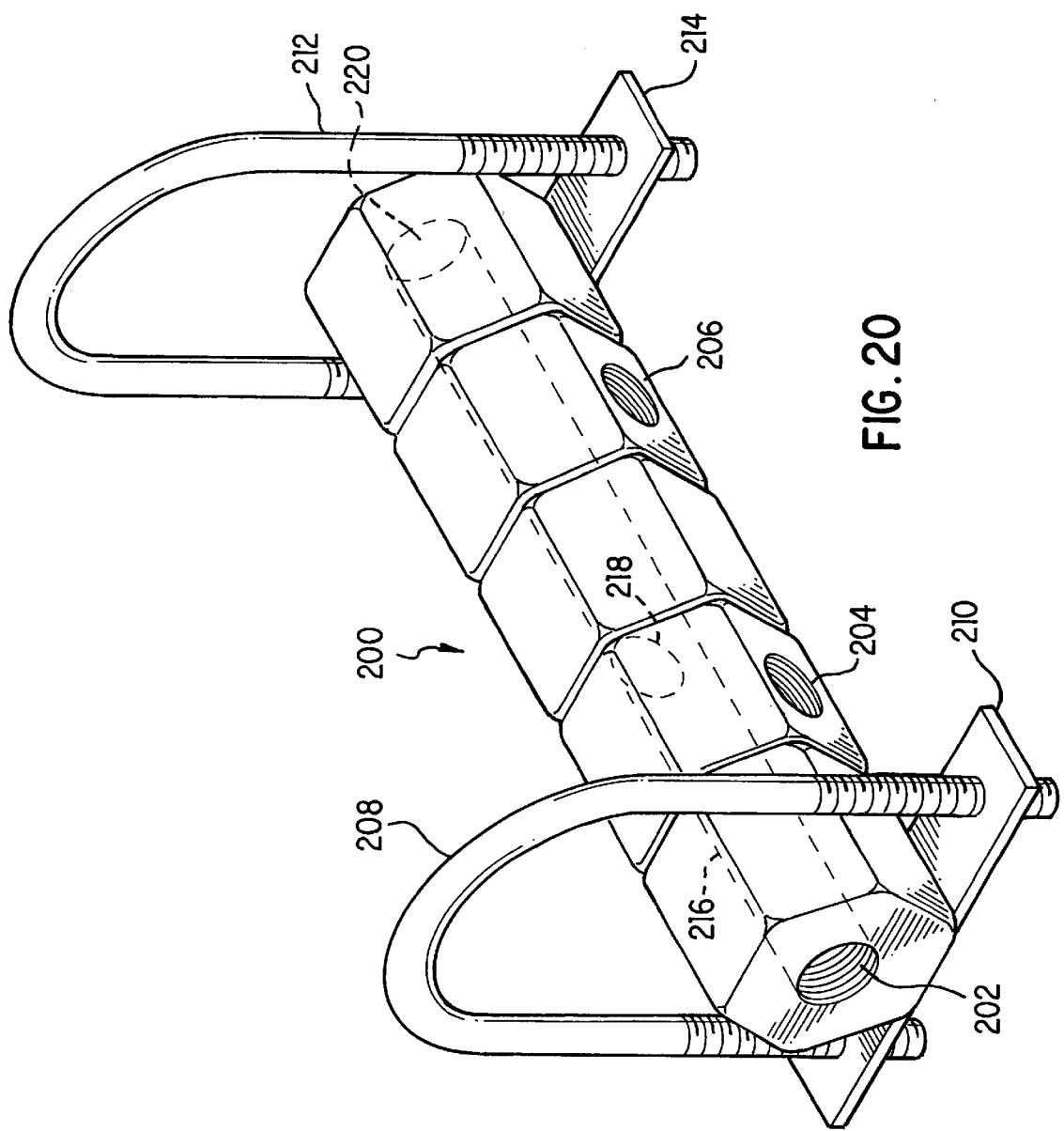
FIG. 20 is a view of a connector assembly for use with the present invention.
Figure 21:
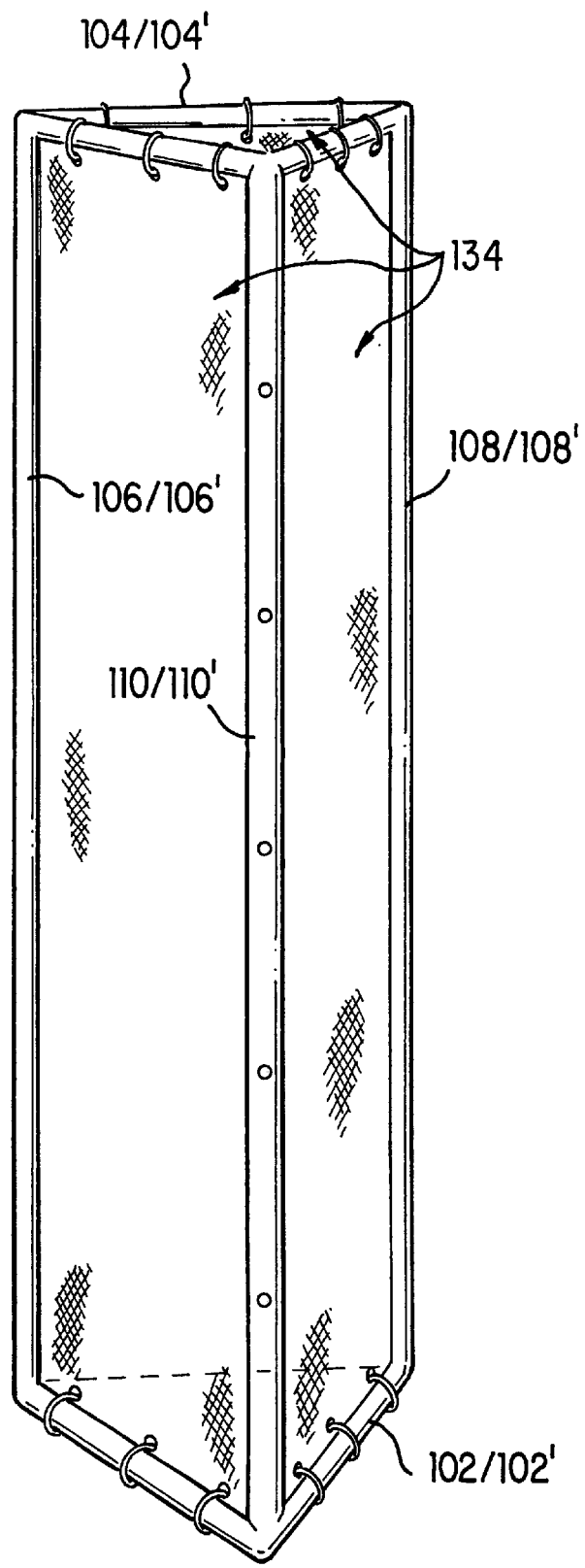
FIG. 21 is a view of the embodiment of either FIG. 14 or 19 with banners.

Turning attention now to FIG. 20, a connector assembly may be used with the embodiment of the present invention illustrated in FIGS. 1–13. Instead of using the complex assembly illustrated in FIG. 10, a connector assembly 200, illustrated in FIG. 20, may be incorporated into the spraying system. The connector assembly 200 includes an inlet 202 at one end thereof that is bored and threaded so that an inlet hose may be connected thereto. Inlet 202 is connected to an internal passageway 216 extending axially through the center of the connector assembly 200. Additional openings 204, 206 may be located throughout the connector assembly 200. The openings 204, 206 may be arranged in a fixed pattern or may be randomly located throughout the connector assembly 200. In a preferred embodiment of the connector assembly 200, additional openings, such as opening 218, would be located on the side of the connector assembly 200 that is not seen. In addition, an additional opening 220 may be located at the end of the connector assembly 200 that is opposite the inlet 202. Nozzles, such as those illustrated in FIG. 4C and described herein above, may be connected to the openings 204, 206. The nozzles may be connected directly to the connector assembly 200, or alternatively, they may be connected through quick connect couplings, such as the couplings illustrated in FIGS. 4A, 4B.

The connector assembly 200 is preferably made from brass. However, it can be made from any other suitable material, including, but not limited to, aluminum, delrin, PVC, ABS, and acrylic.

The connector assembly 200 may be suspended from the roof of a structure, such as the tent illustrated in FIG. 15, with the use of shaped brackets 208, 212. Plates 210, 214 are mounted over the U-shaped brackets to facilitate the assembly thereof. Nuts (not illustrated) may be threaded onto the open ends of the U-shaped brackets 208, 212. The connector assembly 200 provides an efficient way of setting up and operating the claimed invention. The connector assembly 200 may be installed within a tent or to any other structure that is desired.

Figure 24:
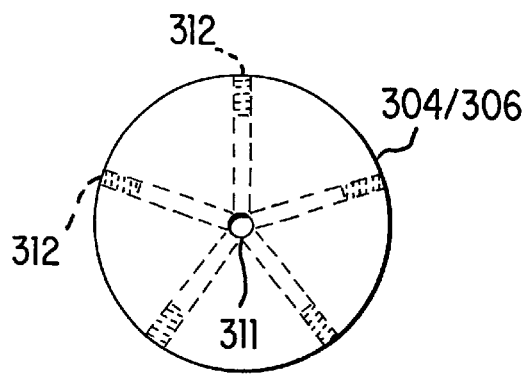
FIG. 24 shows a top view of a bottom or top of the embodiments shown in FIGS. 22 and 23.
Figure 23:
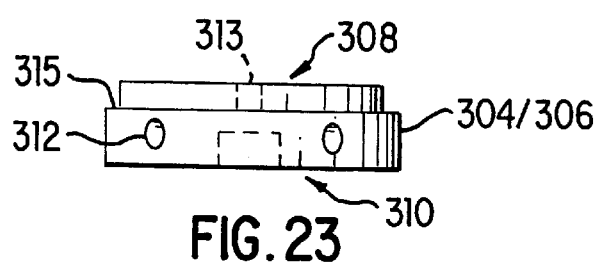
FIG. 23 shows a detailed view of a top 304 or bottom 306.
Figure 22:
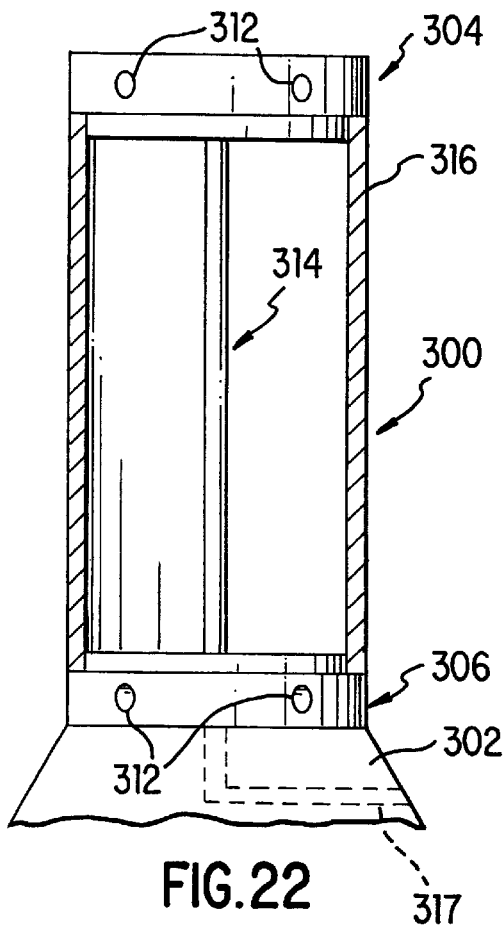
FIG. 22 shows a system mounted on a base of another embodiment.

Turning attention now to FIG. 22 through 24, another embodiment of the present invention is disclosed. The system 300 includes a base 302. The base 302 may be made of concrete or some other heavy substance to provide adequate support for the system 300. The base 302 may be 6–12 inches tall, and 12–24 inches in diameter, or square.

A first bottom 306 is mounted on the base 302. The bottom 306 includes a plurality of openings 312 which are connected to an internal passage 311. A central opening 313 is also connected to the central passage 311.

A nozzle is inserted into each of the openings 312. The nozzles may be any of the nozzles illustrated and discussed earlier in this application. The nozzles may be connected through a quick connect assembly or with threads internally set within the openings 312.

A feed line 317 extends through the base 302 and attaches to the bottom of the first housing 306 through an opening that is connected to the central passage 311. A water line 314 is mounted into the central opening 313 and extends vertically upward from the bottom 306. A top 304 which is substantially similar to the bottom 306, is mounted onto the top of the water line 314. The line 314 is secured to the central opening 313 of the top 304. The bottom 306 rest on a base 302.

A shoulder 315 is provided around the upper end of the bottom 306 and the lower end of the top 304. A cylindrical cover 316 fits between the top and the base. The cylindrical cover 316 is preferably made from aluminum, but may be made from any other suitable material.

Nozzles are also secured to the openings 312 of the top 304, as is also done with the bottom 306. The nozzles in both the top 304 and the base 306 may be set at an upward angle. The angle may be any desired angle including 60°, 45°, 30°, or 20° from the horizontal.

Preferably, the height of the entire system is about 40 inches. However, the system may be made to any desired height.

All of the embodiments of the present invention can be operated continuously or intermittently.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology of terminology and employed herein is for the purpose of description and not of limitation.

What is claimed is:

1. A wind chill producing misting apparatus, comprising:
   a structure having a roof;
   a plurality of nozzles mounted within said structure for spraying a wind chill producing pressure mist which has a wind chill effect on participants, each of said nozzles having an equivalent orifice diameter of the range of 0.026 to 0.076 inches; and
   tubing interconnecting said plurality of nozzles to a source of pressurized water;
   wherein the ratio of nozzles to square feet of structure is in the range of one nozzle per 36 to 45 square feet; and
   wherein the source of pressurized water provides a pressure of 600 psi to 4,000 psi.

2. The misting apparatus of claim 1, further comprising means for controlling the pressure of the water so that wind chill producing pressure mist emitted from the nozzles comprises droplets having a size between 85 and 200 microns.

3. The misting apparatus of claim 2, wherein the controlling means controls the pressure of the water such that wind chill producing pressure mist is emitted from said nozzles with a velocity sufficient to create a wind of five to thirty-five miles per hour in the vicinity of said nozzles.

4. The misting apparatus of claim 1, further comprising means for controlling the pressure of the water such that wind chill producing pressure mist is emitted from said nozzles with a velocity sufficient to create a wind of five to thirty-five miles per hour in the vicinity of said nozzles.

5. The apparatus of claim 1, further comprising at least one side on said structure.

6. The apparatus of claim 1, wherein said nozzles produce a wind chill pressure producing mist having droplets in the range of 85 to 200 microns.

7. The apparatus of claim 1, wherein pressure of the water ranges from 600 psi to 1000 psi.

8. The apparatus of claim 1, wherein each of the nozzles has a flow rate in the range of 0.20 to 5.2 gallons per minute.

9. The apparatus of claim 1, wherein said nozzles have an equivalent orifice diameter of 0.026 inches.

10. The apparatus of claim 1, further comprising at least one side on said structure.

11. The apparatus of claim 1, wherein said structure is a tent.

12. The apparatus of claim 1, wherein the structure is an inflatable structure.

13. The apparatus of claim 1, wherein the wind chill producing pressure mist cools at least one person while attending an outdoor event.

14. The apparatus of claim 1, wherein the wind chill producing pressure mist cools at least one person.

15. A wind chill producing pressure misting apparatus, comprising:
   a structure having a roof;
   a distributor mounted within said structure to the roof of the structure, the distributor including an elongate body having an inlet at one end thereof, an internal passage connected to said inlet and extending through the elongate body, and a plurality of openings spaced along said body, wherein each of said openings are connected to said internal passage;
   a plurality of nozzles for spraying a wind chill producing pressure mist which has a wind chill effect on participants, each of said nozzles having an equivalent orifice diameter in the range of 0.026 to 0.076 inches;
   each of said openings connected to a respective one of the plurality of nozzles; and
   tubing interconnecting said distributor to a source of pressurized water; and
   wherein pressure of the water ranges from 600 psi to 4,000 psi.

16. The apparatus of claim 15, wherein said nozzles produce a wind chill pressure producing mist having droplets in the range of 85 to 200 microns.

17. The apparatus of claim 15, wherein the source of pressurized water provides a pressure of 600 psi or greater.

18. The apparatus of claim 15, wherein each of the nozzles has a flow rate in the range of 0.20 to 5.2 gallons per minute.

19. The apparatus of claim 15, wherein said nozzles have an equivalent orifice diameter of 0.026 inches.

20. The apparatus of claim 17, wherein said nozzles have an equivalent orifice diameter of 0.026 inches.

21. The apparatus of claim 17, wherein said nozzles have a equivalent orifice diameter of 0.026 inches.

22. The apparatus of claim 15, further comprising at least one side on said structure.

23. The apparatus of claim 18, further comprising at least one side on said structure.

24. The apparatus of claim 15, wherein said structure is a tent.

25. The apparatus of claim 17, wherein said structure is a tent.

26. The apparatus of claim 18, wherein said structure is a tent.

27. The apparatus of claim 15, wherein the structure is an inflatable structure.

28. The apparatus of claim 17, wherein the wind chill producing pressure mist cools at least one person while attending an outdoor event.

29. The apparatus of claim 18, wherein the wind chill producing pressure mist cools at least one person while attending an outdoor event.

30. The apparatus of claim 15, wherein the wind chill producing pressure mist cools at least one person while attending an outdoor event.

* * * * *